(12) United States Patent
Hicker et al.

(10) Patent No.: US 9,192,898 B2
(45) Date of Patent: Nov. 24, 2015

(54) WETTING AGENTS

(75) Inventors: Johannes Hicker, Duisburg (DE); Roland Hicker, Bochum (DE); Walter Kunze, Vienna (AT); Beate Ibounig, Vienna (AT)

(73) Assignees: BRAVO-O-TECH GMBH, Duisburg (DE); BUSSETTI & CO. GmbH, Vienna (AT)

( * ) Notice: Subject to any disclaimer, the term of this patent is extended or adjusted under 35 U.S.C. 154(b) by 276 days.

(21) Appl. No.: 13/881,203

(22) PCT Filed: Oct. 31, 2011

(86) PCT No.: PCT/EP2011/069150
§ 371 (c)(1),
(2), (4) Date: May 20, 2013

(87) PCT Pub. No.: WO2012/056045
PCT Pub. Date: May 3, 2012

(65) Prior Publication Data
US 2014/0008834 A1  Jan. 9, 2014

(30) Foreign Application Priority Data
Oct. 29, 2010  (EP) .................................... 10189372

(51) Int. Cl.
*B27N 3/00* (2006.01)
*B27N 3/18* (2006.01)
*B27N 1/00* (2006.01)
*B01F 17/00* (2006.01)
*B27N 3/08* (2006.01)
*D21J 1/04* (2006.01)
*B29D 7/01* (2006.01)

(52) U.S. Cl.
CPC ............ *B01F 17/0092* (2013.01); *B27N 3/083* (2013.01); *B27N 3/18* (2013.01); *B29D 7/01* (2013.01); *D21J 1/04* (2013.01); *B27N 1/00* (2013.01)

(58) Field of Classification Search
None
See application file for complete search history.

(56) References Cited

U.S. PATENT DOCUMENTS

| 5,049,196 A | 9/1991 | Ries | |
|---|---|---|---|
| 5,063,010 A * | 11/1991 | Fischer et al. | ................. 264/109 |
| 5,538,676 A * | 7/1996 | Bielfeldt | ....................... 264/109 |
| 7,220,375 B2 | 5/2007 | von Haas et al. | |
| 2005/0082709 A1 | 4/2005 | von Haas et al. | |

FOREIGN PATENT DOCUMENTS

| CN | 1875912 A | 12/2006 |
|---|---|---|
| DE | 10 2006 058 612 A1 | 6/2008 |
| EP | 0 338 548 A2 | 10/1989 |
| EP | 1 275 370 A1 | 1/2003 |
| EP | 1 508 414 A2 | 2/2005 |
| WO | 87/05955 A1 | 10/1987 |

OTHER PUBLICATIONS

Office Action from corresponding Chinese Patent Application No. 201180052877.X, dated Jun. 13, 2014 (9 pages).

* cited by examiner

*Primary Examiner* — Mary F Theisen
(74) *Attorney, Agent, or Firm* — Dardi & Herbert, PLLC.; Peter S. Dardi

(57) ABSTRACT

The invention relates to wetting agents for wetting working material for producing pressed material boards, comprising polyols, acylglycerides or acylglyceride derivatives, surfactants, and water.

14 Claims, No Drawings

WETTING AGENTS

CROSS REFERENCE TO RELATED APPLICATIONS

This application is a national stage filing of PCT application number PCT/EP2011/069150 filed on Oct. 31, 2011, which claims priority to European patent application number 10189372.5 filed on Oct. 29, 2010, both of which are incorporated herein by reference.

The present invention relates to a wetting agent for pressing cakes of material admixed with binder, especially for producing material boards, preferably wood-based material boards, and to a process for pressing cakes of material.

In a pressing process for producing material boards, it is known to wet the cake of material during or immediately before the pressing in order to penetrate the material by means of a steam burst and thus to transport heat into the cake of material in order to accelerate the setting of the binder within the cake of material.

For example, from EP 1 508 414 A2, it is known to apply steam to one side of the cake of material in the press, wherein it is tried to introduce as low amounts of steam as possible in order to prevent the binder from being washed out, and to enable as short a pressing process as possible.

From DE 10 2006 058 612 A1, it is known to wet the cake of material by means of steam before pressing.

Such a wetting method has the disadvantage that only a very imprecise dosage of the wetting agent is possible because the wetting agent is applied in a steam condition.

In addition, an application of steam is always associated with relatively high losses of wetting agent.

Therefore, it is the object of the present invention to provide a wetting agent that avoids disadvantages of the prior art.

This object is achieved by a wetting agent comprising polyols, acylglycerides or derivatives thereof, surfactants, and water.

The polyols have at least two OH groups, wherein said OH groups may be primary, secondary or tertiary OH groups. The polyols preferably have at least two primary OH groups. Such compounds are also referred to as glycols. Higher chain polyols may also be employed as said polyols.

Various natural or non-natural substances may be employed as said acylglycerides. In a preferred embodiment, the wetting agent contains acylglycerides containing unsaturated fatty acids. These can be obtained from rapeseed oil, for example.

Monoacylglycerides, diacylglycerides or triacylglycerides may be employed as said acylglycerides. If triacylglycerides are employed, they are preferably substances that are liquid at room temperature (25° C.). The use of materials based on vegetable oils is preferred. The triacylglycerides may be simple triacylglycerides in which the side chains are equal, but mixed side chains may also be present.

Derivatives include, in particular, sulfated and phosphated derivatives.

In one embodiment of the invention, only one or two hydroxy groups may be esterified, the other two being free of modified.

In the wetting agent according to the invention, preferably 5 to 20 parts by weight of polyol are present together with 2 to 10 parts by weight of acylglycerides or acylglyceride derivatives, and 10 to 30 parts by weight of surfactants.

The amount of water can be adjusted as a function of the machine requirements. Typically, the product contains a relatively high amount of water, based on the values stated above. The wetting agent can be stored as a concentrate, in which case the amount of water is about 60 parts of water, based on the values stated above. However, in such a case, the product can be diluted by a factor of 2 to 10 even before being applied to the cake of material.

Ionic surfactants, for example, anionic and cationic surfactants, have proven suitable as said surfactants. However, in some embodiments, non-ionogenic surfactants may be employed. Preferably, a mixture of surfactants is employed.

The wetting agent according to the invention may contain further auxiliaries, for example, colorants or perfumes. Further, thickening agents may be employed to control viscosity. Fillers or adhesion promoters, which have a smoothing effect on the surface of the pressed material boards, may also be contained. In principle, the wetting agent according to the invention may be sprayed onto a cake of material. Preferably, however, the wetting agent is applied by a roller.

An exact dosage of the amount of wetting agent transferred to the cake of material is possible by using an application roller and a metering roller that can be brought into contact with the application roller. Thus, the moisture necessary for a rapid pressing and a high surface quality can be transferred to the cake of material. Since the wetting agent is applied to the cake of material, the wetting agent at first remains on the surface of the cake of material, or in the region near the surface of the cake of material. The wetting agent may be applied from above, from below, or from both above and below.

When the cake of material enters the press, the high moisture content at the surface and the high temperature of the press plate cause a sudden vaporization, so that a burst of steam is created through the cake of material. Thus, a particularly thorough heat penetration of the cake of material is possible. Further, the thorough heat penetration of the cake of material because of the burst of steam accelerated the setting of the binder, especially inside the cake of material. The wetting agent at the surface further causes an improved surface smoothness of the ready-pressed board, so that the grinding depth is lower during the further processing. Further, an improved surface smoothness has the effect, that the pores at the surface of the board are smaller. Therefore, the paints or adhesives applied later will not penetrate too deep into the board, so that the paint consumption is substantially lower.

The wetting agent makes the fibers of the cake of material more elastic and more readily compacted. After the pressing, a thin layer ("pressing skin") in part remains on the surface and must be slightly ground off.

The wetting of the cake of materials by application rollers can advantageously ensure that the wetting agent can be readily dosed, and the loss of wetting agent is at the same time kept very low. In addition, since the cake of material is wetted from below, the burst of steam generated during the pressing of the cake of material, which is supposed to penetrate to the inside of the cake of material, can be produced in a particularly advantageous manner, because the burst of steam penetrates the cake of material from above and below. At the same time, since the cake of material is wetted from below, effects of deforming the cake of material arising from the wetting process can be counteracted.

EXAMPLE

A wetting agent comprising
10% by weight of purified soybean oil predominantly containing glycerides of oleic acid and linolic acid;
8% by weight of 1,2-propylene glycol;
12% by weight of surfactant (a mixture of anionic and non-ionogenic surfactants);

70% by weight of water;

was diluted with water by 1:3, sprayed onto a cake of wood-based material comprising the binder melamine-urea-phenol-formaldehyde (MUPF), and the cake is pressed.

A smooth and strong board was obtained.

The invention claimed is:

1. A wetting agent for wetting a material used for preparing pressed material boards, comprising polyols, acylglycerides or derivatives thereof, surfactants, and water.

2. The wetting agent according to claim 1, wherein said polyol is a glycol.

3. The wetting agent according to claim 1, wherein said acylglycerides are selected from mono-, di- and triacylglycerides.

4. The wetting agent according to claim 1, wherein said acylglyceride derivatives are sulfated or phosphated acylglycerides.

5. The wetting agent according to claim 1, wherein said surfactants are ionic.

6. The wetting agent according to claim 1, comprising:
   from 5 to 20 parts by weight of polyol;
   from 2 to 10 parts by weight of acylglycerides or acylglyceride derivatives;
   from 10 to 30 parts by weight of surfactants;
   from 10 to 100 parts by weight of water.

7. The wetting agent according to claim 1, wherein further auxiliaries, are comprised therein.

8. The wetting agent according to claim 1, wherein thickening agents are comprised therein.

9. The wetting agent according to claim 1, wherein fillers or adhesion promoters are comprised therein.

10. The wetting agent according to claim 1, wherein said material is a wood-based material.

11. A process for producing pressed material boards, comprising the following steps:
    preliminary pressing a material to form a cake of material;
    wetting said cake of material with a wetting agent according to claim 1;
    pressing the cake of material to form a material board.

12. The process according to claim 11, wherein said material board is a wood-based material board.

13. The process according to claim 11, wherein said wetting agent is applied from above, from below, or from both above and below.

14. The wetting agent of claim 7 wherein the further auxiliaries comprise colorants or perfumes.

* * * * *